Sept. 12, 1944.  J. MIHALYI  2,358,084
LIGHT METER CAMERA
Filed Oct. 7, 1942
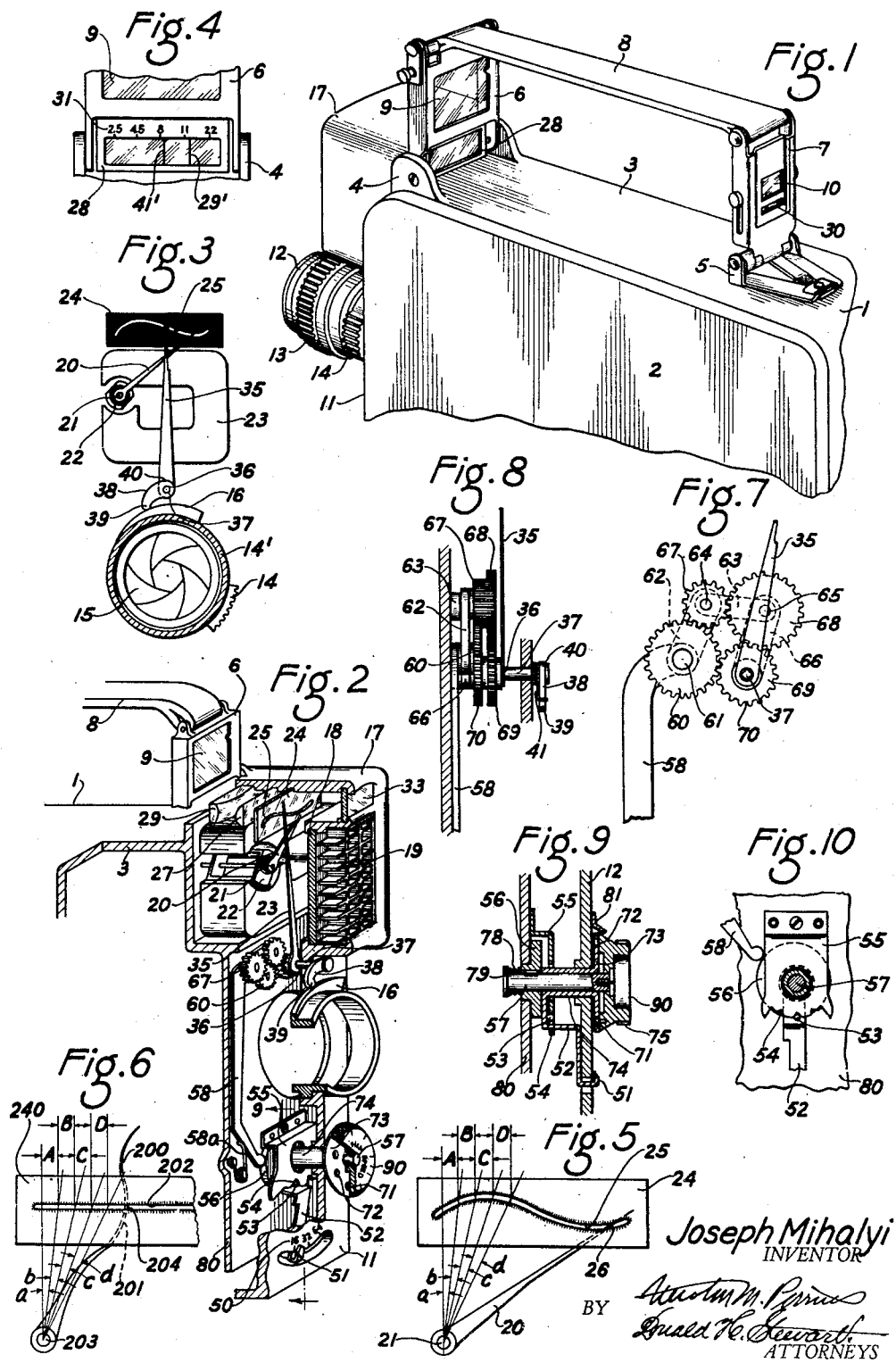
Joseph Mihalyi
INVENTOR
BY
ATTORNEYS Patented Sept. 12, 1944

2,358,084

UNITED STATES PATENT OFFICE 2,358,084

LIGHT METER CAMERA

Joseph Mihalyi, Rochester, N. Y., assignor to Eastman Kodak Company, Rochester, N. Y., a corporation of New Jersey Application October 7, 1942, Serial No. 461,213

8 Claims. (Cl. 88—23)

This invention relates to photography and more particularly to a light meter camera. One object of my invention is to provide a light meter particularly adapted for use with cameras to provide a means for measuring light for a camera which may be operated automatically or semi-automatically. Another object of my invention is to provide a light meter in which angular movement of a meter pointer about a pivot may be translated into uniform linear movement to facilitate reading the position of the light meter pointer on the camera. Another object of my invention is to provide a camera and meter, both of which are provided with pivoted pointers and to change the apparent direction of movement of the pointer to a linear movement to facilitate reading the positions of the indicating pointers and other objects will appear from the following specification, the novel features being pointed out in the claims at the end thereof.

In most automatic or semi-automatic cameras it is customary to provide a light-sensitive meter, preferably of the dry photovoltaic type, in which there is a field magnet which is adapted to turn an armature coil in accordance with the current generated, the armature coil in turn, by receiving a pointer, indicating the quantity of light by the movement of the pointer over a scale. Thus, the pointer moves through various angles about its pivot and one of the difficulties with such a light-sensitive meter is that the movements of the pivoted arm cannot be properly correlated with the movements of a camera light adjusting member, such as a diaphragm which must also be adjusted by moving an adjusting member angularly about a camera objective and through an arcuate path.

In accordance with my invention I provide the adjusting members which move angularly about a pivot or through an arcuate path with a means for translating the angular rotative movement into a uniform linear movement, and by providing in the translating means suitable compensating mechanism it is possible to cause the meter pointer to move through a linear path corresponding to that of the diaphragm pointer, so that the two pointers are not only readily visible to a camera operator but they can be accurately positioned throughout their various angles of movement to give correct readings for the particular camera diaphragm movement which may be required for the camera objective.

Coming now to the drawing wherein like reference characters denote like parts throughout:

Fig. 1 is a fragmentary perspective view of a motion picture camera constructed in accordance with and embodying a preferred form of my invention;

Fig. 2 is a fragmentary and somewhat schematic perspective view partially in section of a typical control mechanism constructed in accordance with my invention;

Fig. 3 is a schematic plan view showing a portion of the adjusting mechanism shown in Fig. 2;

Fig. 4 is a fragmentary view showing the astigmatic images of the meter pointer and diaphragm pointers as they appear to an operator looking through the camera view finder;

Fig. 5 is a diagrammatic view showing one method of changing from angular movement to linear movement;

Fig. 6 is a view similar to Fig. 5 but of a second embodiment of the movement translating mechanism;

Fig. 7 is a schematic view of a part of the adjusting mechanism which may be used on my improved camera;

Fig. 8 is a fragmentary side elevation partially in section of the mechanism shown in Fig. 7;

Fig. 9 is a section taken on line 9—9 of Fig. 6; and

Fig. 10 is a fragmentary front plan view showing a portion of the adjusting mechanism of Fig. 9.

My invention consists broadly in providing an adjusting mechanism for cameras in which one or more indicating pointers which move about a pivotal point may be so arranged that, to an operator of the camera, they will appear to move through a linear path so that such a pointer may more readily be brought opposite to suitable graduations or may be readily brought into a registering position with a second pointer.

One way that my invention can be carried out is indicated in the accompanying drawing. A motion picture camera of a known type is shown in Fig. 1 wherein the camera is provided with a camera body 1 having a side door 2 which may be opened for loading film into the camera, and having a top wall 3 supporting, on suitable brackets 4 and 5, hinged members 6 and 7 which perform a number of functions, one of which is to support a camera handle 8.

A second function of the brackets 6 and 7 is to support the view finder elements 9 and 10 through which an operator may determine the field of view. The camera is provided with a front wall 11 which may carry a camera objective in a lens mount 12, this lens mount preferably being provided with a focusing ring 13 and a diaphragm adjusting knob 14 which is movable to cause the diaphragm plates 15 to open and close in a known manner.

The diaphragm adjusting ring 14' is also provided with a cam 16 for a purpose which will be hereinafter more fully described.

The front wall 11 of the camera includes a housing 17 into which a light-sensitive cell, preferably of the dry photovoltaic type, may be included. This cell 18 is mounted behind suitable baffles 19 which control the direction of light passing through to the cell. The housing 17 also includes a window 33 which may be covered with a light diffusion medium such as ground glass.

As indicated in Fig. 3, the light meter includes a meter pointer 20, which in this instance may swing about its pivot 21 as the armature coil 22 is turned by current in the field magnet 23 which is electrically connected in a known manner with the light-sensitive element 18. Thus, the pointer 20 swings about its pivot in accordance with the current generated by light passing through the baffles 19 and falling upon the cell 18. It will be noted from Fig. 3 that the meter pointer arm 20 is pivoted at 21 to one side of the meter and this is done in order to permit a translating device to obtain linear uniform movement of an image of the pointer arm as the pointer arm moves radially about its pivot.

I accomplish this by providing a masking plate 24, as indicated in Fig. 5, with a curved slot 25, this curve being laid out so that when the meter moves through the angles a, b, c, d, etc., a small portion 26 of the meter arm will appear through the slot 25 as moving a substantial distance A, B, C, D, etc., across the length of the slot. However, as indicated in Fig. 5, the meter pointer 20 will nearly always appear as crossing the slot 25 at an angle except when the needle is in a vertical position.

In order to make an image of the needle appear to be vertical at all times, as indicated in Fig. 4, I mount a cylindrical lens 27, as shown in Figs. 2 and 4, above the mask plate 24, this cylindrical lens being focused substantially upon the meter arm 20. The cylindrical lens, therefore, forms an astigmatic image of the meter arm so that the image appearing in the frame 28 in the lower part of the bracket 6 will appear as a straight line 29' which moves across the oblong frame 28. I prefer to provide a magnifying lens 29 to increase the apparent size of the image when it is viewed through a window 30 in the camera bracket 7.

There is an additional advantage in having the peephole 30 in the bracket 7 and that is that it limits the position in which an operator's eye can be placed to view the images formed by the cylindrical lens 27. If not limited, and if the eye could be moved to a considerable angle to either side of the peephole 30, the image 29' of the pointer would also apparently move which would of course be undesirable.

With the construction above described the image 29' of the pointer is extremely easy to read from a diaphragm scale 31 and the spaces between the graduations on this scale can be spaced well apart so that they may be readily viewed.

There is an additional reason for providing such a construction and that is that it permits the diaphragm of various lenses to be provided with a means for translating the movement of a pivoted pointer to a linear movement which will correspond with the movement of the meter pointer 20.

As indicated in Fig. 3, the objective may be provided with the diaphragm leaves 15 which may be opened or closed by the handle 14 which simultaneously operates a cam 16, this cam being designed for the angle of movement and for the particular diaphragm incorporated in the lens barrel 12. The diaphragm pointer 35 also extends to a position adjacent the mask plate 24 and lies in a plane close to, but slightly spaced from, the plane of the meter pointer 20. The reason for this is that the two meter arms are spaced sufficiently close so that both meter arms may be substantially in the plane of the focus of the cylindrical lens 27.

The diaphragm arm 35 is pivoted at 36 to a shaft 37 to which the meter arm is pinned and there is a second arm 38 having one end 39 bearing on the cam 16 and the other end 40 frictionally engaging the shaft 37 so as to normally turn the shaft. A spring 41 tends to hold the lever in contact with the cam 16. Thus, when the handle 14 is turned the cam 16 moves the diaphragm pointer 35 across the mask plate 24 and an astigmatic image 41' of this pointer is formed by the cylindrical lens 27 so that when an operator looks through the peephole 30 he may see both pointers 29' and 41'. These may be colored differently if desired so that he can readily distinguish the meter pointer from the diaphragm pointer. By turning the handle 14 the pointer image 41' may be brought into registration with the pointer image 29' so that the diaphragm will be properly set for the prevailing light conditions.

The proper exposure includes additional factors in that the shutter speed must be considered and the film speed must be considered. I have provided a means for taking care of these adjustments as indicated in Fig. 2.

As indicated in this figure I have provided a shutter speed scale 50 over which a pointer 51 is adjustably mounted, this pointer, as indicated in Fig. 9, being movable in the form indicated to three positions in which the shutter may be making 16, 32, or 64 frames per second. The arm 52 carrying the pointer is provided with a pin 53 which may snap into any one of the three notches 54 in a spring plate 55 to hold the pointer in a set position. When the lever 52 is moved a cam 56, which is keyed to a shaft 57, is moved and this cam contacts an arm 58, best shown in Fig. 2, which carries a gear 60.

Referring to Fig. 7, the gearing between lever 58, shaft 37 and cam follower 39 is such that pointer 35 may be moved solely through cam follower 39 without moving cam follower 58 or vice versa. In fact, if occasion should arise, both cams 56 and 16 could be moved simultaneously and still give the required movement to pointer 35.

This is accomplished in the following manner. Arm 58 moved by cam 56 causes the linkage 62, 63 and 66 to move. These links are connected by pivots 61, 64, 65 and shaft 37. The friction of spring 40 upon shaft 37 tends to hold shaft 37 stationary so that gears 60 and 70 remain stationary. As gear 67 moves clockwise about 60, 68 moves counter-clockwise driving gear 69 and with it pointer 35. During these movements cam follower 39 does not move, but the pointer is adjusted for the desired film speed or shutter speed or both.

If the diaphragm lever 14 is now moved the pointer 35 will move. If diaphragm cam follower 39 moves the pointer 35 counter-clockwise, for instance, all the gears move together but the linkage 62, 63 and 66 remains stationary. Thus, the pointer 35 moves without lever 58 moving so that either cam follower 39 or 58 may adjust the pointer 35 without otherwise disturbing the adjustment made by the other member. Only a light spring 58a is required to hold lever 58 against cam 56.

If, however, film of different speeds is used a second compensating mechanism must be employed, this being indicated in Fig. 2 by the dial 90. This dial is graduated into units of film speeds and it is carried by the shaft 57 being attached to the shaft and having a pin 71 which may engage any one of a series of apertures 72 in a disk 73 carried by the sleeve shaft 74 moved by the lever 52. If it is desired to change the film speed the knurling 75 may be used to disengage the pin 71 from an aperture 72 so that the pointer 51 may remain stationary while the shaft 57 is moved. This is possible because of a spring 78 lying between the head 79 on the shaft and the wall 80 of the mechanism plate. Thus, after once setting dial 90 to the required speed, as indicated by a pointer 81 carried by the front wall 11, this dial needs no further adjustment.

In Fig. 5 the mask plate 24 is shown with a curved slot 25 and the meter pointer 20 is straight. If desired I may reverse the parts to the extent shown in Fig. 6 wherein the meter pointer 200 is provided with a curved area 201 adapted to lie under the straight slot 202 in the mask plate 240 so that, here again, the curvature of the cooperating members—the meter needle and the mask plate—is such that equal uniform distance A, B, C, etc. along a linear scale will be provided as the pointer moves through the angles a, b, c, etc. about its pivot 203. Thus, the small area 204 of the meter needle which will appear through the slot 202 will provide a dot which the cylindrical lens 27 will translate into an astigmatic image which will appear as a vertical line when viewed through the finder as described above.

With the translating device above described, it will be noticed that the graduations along the scale 31 can be spaced apart a distance sufficient to make it a simple matter to read the light setting of the meter arm; and, in addition, where two pointer arms are used, one for the diaphragm and one for the meter, both of these may appear as line images because of the cylindrical lens. The shape of the curved surface of either the masking plate or the master arm can be designed for the particular characteristics of the meter so as to provide the required linear movement of the meter arm image, and of course the shape of the cam 16 can likewise be designed so that the movement of the diaphragm arm can be coordinated with the movement of the meter arm, so that when the two images of the two arms 29 and 41 are registered at any point along the scale the parts will be in the proper position to give the required exposure.

In case the film speed is altered the operator needs only to move the dial 90 to correct for this change in film speed. If the camera speed is altered it is only necessary to move the pointer 51 which may, if desired, not only turn the arm 52 but also turn an adjusting member for varying the camera speed. Thus, if these simple adjustments are made with the camera illustrated in the drawing, it is only necessary for an operator to look through the view finder peephole 30 and register the pointer images 29' and 41' to properly set the camera for the prevailing light conditions changing the dials 90 and the pointer 51 only when the film speed and shutter speed is changed.

What I claim is:

1. In a light meter for cameras, the combination with a light-sensitive cell, of a field coil connected thereto, an armature coil, a pivotally-mounted pointer to be moved thereby with changes of light on the light-sensitive cell, a mask plate adjacent the pointer and constituting, with the pointer a pair of intersecting light indicating elements lying close to a plane, at least one light indicating element having a curved form to provide substantially uniform linear spacing of the intersecting points of the light indicating elements for predetermined light changes, a cylindrical lens substantially focused on the mask and pointer to provide a straight line image of that portion of the pointer visible through the mask irrespective of the angle of the intersecting elements.

2. In a light meter for cameras, the combination with a light-sensitive cell, an armature coil connected thereto, a pivotally mounted pointer adapted to be moved thereby with changes in light, a mask plate mounted adjacent the pointer, a cylindrical lens mounted thereover, said mask plate having a light transmitting portion and a light obscuring portion, the light transmitting portion being adapted to expose only a small portion of the pointer and having a curved shape selected to provide, in said cylindrical lens, an astigmatic image in the form of a straight line having uniform spacing for predetermined light changes.

3. In a light meter for cameras, the combination with a light-sensitive cell, an armature coil connected thereto, a pivotally-mounted pointer adapted to be moved thereby with changes in light, a mask plate mounted adjacent the pointer, a cylindrical lens mounted thereover, said pivotally-mounted pointer having a curved shape, a mask plate mounted adjacent the pointer and including a light transmitting area and a light obscuring area, the latter obscuring all but a small portion of the pointer, the curve of the pointer being selected to give uniform spacing of an astigmatic image thereof as viewed through the cylindrical lens for predetermined changes in the light falling on the light-sensitive cell.

4. In a light meter for cameras, the combination with a light-sensitive cell, of a field coil connected thereto, an armature coil, a pivotally-mounted pointer to be moved thereby with changes of light on the light-sensitive cell, a mask plate adjacent the pointer and constituting, with the pointer a pair of intersecting light indicating elements lying close to a plane, one of said intersecting light elements having a curved shape selected to provide intersecting points with substantially uniform spacings for uniform variations in light falling on the light-sensitive cell, a cylindrical lens mounted for viewing the intersecting elements to produce a straight line image of said pointer element to facilitate determination of the relative positions of the intersecting light determining elements.

5. In a light meter for cameras, the combination with a light-sensitive cell, of a field coil connected thereto, an armature coil, a pivotally-mounted pointer to be moved thereby with changes of light on the light-sensitive cell, a mask plate adjacent the pointer and constituting, with the pointer a pair of intersecting light indicating elements lying close to a plane, at least one light indicating element having a curved form to provide substantially uniform linear spacing of the intersecting points of the light indicating elements for predetermined light changes, a cylindrical lens substantially focused on the mask and pointer to provide a straight line image of that portion of the pointer visible through the mask irrespective of the angle of the intersecting elements, a lens diaphragm pointer, a pivotal mount therefor spaced from the pivot of the pivotal mount of the first-mentioned pointer, said lens diaphragm pointer being located beneath and viewable through said cylindrical lens, and connections between said diaphragm pointer and diaphragm for moving said pointer beneath the cylindrical lens to provide a substantially uniform linear image of said diaphragm pointer which may be registered with the straight line image of the pivotally-mounted pointer to be moved by the field coil of the light-sensitive meter.

6. In a light meter for cameras, the combination with a light-sensitive cell, an armature coil connected thereto, a pivotally mounted pointer adapted to be moved thereby with changes in light, a mask plate mounted adjacent the pointer, a cylindrical lens mounted thereover, said mask plate having a light transmitting portion and a light obscuring portion, the light transmitting portion being adapted to expose only a small portion of the pointer and having a curved shape selected to provide, in said cylindrical lens, an astigmatic image in the form of a straight line having uniform spacing for predetermined light changes, a lens diaphragm pointer, a pivotal mount therefor spaced from the pivot of the pivotal mount of the first-mentioned pointer, said lens diaphragm pointer being located beneath and viewable through said cylindrical lens, and connections between said diaphragm pointer and diaphragm for moving said pointer beneath the cylindrical lens to provide a substantially uniform linear image of said diaphragm pointer which may be registered with the straight line image of the pivotally-mounted pointer to be moved by the field coil of the light-sensitive meter.

7. In a light meter for cameras, the combination with a light-sensitive cell, an armature coil connected thereto, a pivotally-mounted pointer adapted to be moved thereby with changes in light, a mask plate mounted adjacent the pointer, a cylindrical lens mounted thereover, said pivotally-mounted pointer having a curved shape, a mask plate mounted adjacent the pointer and including a light transmitting area and a light obscuring area, the latter obscuring all but a small portion of the pointer, the curve of the pointer being selected to give uniform spacing of an astigmatic image thereof as viewed through the cylindrical lens for predetermined changes in the light falling on the light-sensitive cell, a lens diaphragm pointer, a pivotal mount therefor spaced from the pivot of the pivotal mount of the first-mentioned pointer, said lens diaphragm pointer being located beneath and viewable through said cylindrical lens, and connections between said diaphragm pointer and diaphragm for moving said pointer beneath the cylindrical lens to provide a substantially uniform linear image of said diaphragm pointer which may be registered with the straight line image of the pivotally-mounted pointer to be moved by the field coil of the light-sensitive meter.

8. In a light meter for cameras, the combination with a light-sensitive cell, of a field coil connected thereto, an armature coil, a pivotally-mounted pointer to be moved thereby with changes of light on the light-sensitive cell, a mask plate adjacent the pointer and constituting, with the pointer a pair of intersecting light indicating elements lying close to a plane, one of said intersecting light elements having a curved shape selected to provide intersecting points with substantially uniform spacings for uniform variations in light falling on the light-sensitive cell, a cylindrical lens mounted for viewing the intersecting elements to produce a straight line image of said pointer element to facilitate determination of the relative positions of the intersecting light determining elements, a lens diaphragm pointer, a pivotal mount therefor spaced from the pivot of the pivotal mount of the first-mentioned pointer, said lens diaphragm pointer being located beneath and viewable through said cylindrical lens, and connections between said diaphragm pointer and diaphragm for moving said pointer beneath the cylindrical lens to provide a substantially uniform linear image of said diaphragm pointer which may be registered with the straight line image of the pivotally-mounted pointer to be moved by the field coil of the light-sensitive meter.

JOSEPH MIHALYI.